United States Patent
Heyn et al.

(10) Patent No.: US 6,692,090 B1
(45) Date of Patent: Feb. 17, 2004

(54) METHOD OF MAINTAINING THE EFFECT OF THE ENGINE BRAKE

(75) Inventors: Harald Heyn, Colbe-Bürgeln (DE); Martin Kümmel, Spangenberg (DE); Thomas Corell, Wiesbaden (DE)

(73) Assignee: Continental Teves, AG & Co. OHG, Frankfurt (DE)

(*) Notice: Subject to any disclaimer, the term of this patent is extended or adjusted under 35 U.S.C. 154(b) by 0 days.

(21) Appl. No.: 09/914,810

(22) PCT Filed: Mar. 3, 2000

(86) PCT No.: PCT/EP00/01855

§ 371 (c)(1), (2), (4) Date: Feb. 19, 2002

(87) PCT Pub. No.: WO00/53473

PCT Pub. Date: Sep. 14, 2000

(30) Foreign Application Priority Data

Mar. 8, 1999 (DE) .......... 199 10 055
May 5, 1999 (DE) .......... 199 20 617

(51) Int. Cl.[7] .............. B60T 8/34; B60T 8/60
(52) U.S. Cl. .............. 303/192; 303/139
(58) Field of Search .............. 303/139, 192, 303/141, 146, 149

(56) References Cited

U.S. PATENT DOCUMENTS 5,329,453 A * 7/1994 Tsuyama et al. .......... 303/192
5,997,108 A * 12/1999 Claussen et al. .......... 303/192
6,076,898 A * 6/2000 Ota et al. .......... 303/139
6,193,333 B1 * 2/2001 Guest .......... 303/192

FOREIGN PATENT DOCUMENTS

| DE | 37 36 807 | 5/1989 |
| DE | 43 38 399 | 5/1995 |
| DE | 196 37 297 | 3/1998 |
| DE | 196 48 559 | 5/1998 |
| DE | 198 17 212 | 10/1998 |
| DE | 198 35 937 | 2/2000 |
| EP | 856 446 | 8/1998 |
| WO | 96/11826 | 4/1996 |

* cited by examiner

Primary Examiner—Matthew C. Graham
(74) Attorney, Agent, or Firm—Brinks Hofer Gilson & Lione

(57) ABSTRACT

The present invention relates to a method of maintaining the effect of the engine brake of a vehicle during hill descent by way of an active, electronically controlled intervention of the brakes on at least one wheel. The present invention is characterized by a determination of the status of the wheels split into 'stable wheels' and 'unstable wheels' and the deceleration of all stable wheels (11 to 14) in the event of at least one unstable wheel, on which the condition $$V_{unstable} < K_i \times V_{ref}$$

occurs, wherein $V_{unstable}$ = speed of the unstable wheel
$V_{ref}$ = medium wheel speed of the stable wheels
$K_i$ = correction factor (FIG. 2).

16 Claims, 2 Drawing Sheets

Fig. 1: Dragtorque Support DTS

Ablaufplan Dragtorque Support (DTS)
flow chart

METHOD OF MAINTAINING THE EFFECT OF THE ENGINE BRAKE

The present invention relates to a method of maintaining the effect of the engine brake of a vehicle during hill descent by way of an active, electronically controlled intervention of the brakes on at least one wheel.

Road vehicles are known in the art that are equipped with devices which permit taking influence on the driving behavior of the vehicle, irrespective of the driver, by means of predefinable pressures in individual wheel brakes and by means of an intervention into the engine management of the drive engine. These devices relate to a brake slip control system (ABS) that is intended to prevent locking of individual wheels during a brake operation, a traction slip control system (TCS) that prevents spinning of the driven wheels, an electronic brake force distribution system (EBD) which controls the ratio of the brake forces between the front and rear axles of the vehicle, and an electronic driving stability control system (ESP) which ensures stable driving conditions in cornering maneuvers.

'Vehicle' in this context refers to an automotive vehicle with four wheels which is equipped with a hydraulic brake system. The assembly units, which are already provided in the vehicle, such as the electronic system, wheel speed sensors, acceleration sensors, solenoid control valves, etc., are also used to implement the method of controlling the driving speed of a vehicle during hill descent, inasfar as these units are required for the said method. It goes without saying that these known assembly units can also be employed in a vehicle exclusively for the method of maintaining the effect of engine braking of a vehicle during hill descent.

WO 96/11826 A1 discloses a vehicle with a so-called hill descent control (also referred to as HDC=Hill Descent Control) which can be activated by a driver by means of a switch. This control is able to maintain the vehicle on a steep hill descent at a constant low speed by way of an active controlled braking operation without the driver needing to apply the brakes. This system is especially intended for use on off-road vehicles riding on a descending gradient which is so steep that the effect of engine braking is no longer sufficient to decelerate the vehicle, not even in the lowest gear. A speed controller compares the target speed with the actual speed and calculates therefrom a brake pressure for all four wheel brakes, by taking into consideration various marginal conditions.

Further, DE 198 17 212 A1 discloses a system for four-wheel drive vehicles with a central differential gear which provides a device for brake control by means of which either brake force is applied to a freely rotating wheel unable to transmit force onto a roadway, or to the two front wheels. The objective is to prevent an inadvertent acceleration due to the freely rotating wheel in a four-wheel permanently driven vehicle because no engine brake torque is transmitted under these conditions unless the central differential gear is locked by a central differential lock mechanism.

An object of the present invention is to provide a method of maintaining the effect of the engine brake of a vehicle during hill descent which safely prevents wheels that rotate in opposition to the driving direction and an acceleration of the vehicle.

This object is achieved by the features of claim 1.

Favorable improvements are indicated in the subclaims.

Due to the fact that in a method of maintaining the effect of engine braking of a vehicle during hill descent, a determination of the status of the wheels split into 'stable wheels' and 'unstable wheels' and the deceleration of all stable wheels in the event of at least one unstable wheel, on which latter the conditions preferably $A_{unstable} < -0.4$ h and $V_{unstable} < K_i \times V_{ref}$ occur, is effected by way of an active electronically controlled brake intervention on at least one wheel, wherein $V_{unstable}$=speed of the unstable wheel $V_{ref}$=filtered medium wheel speed of the stable wheels $K_i$=correction factor ($K_i < 1$)

$A_{unstable}$=acceleration of the unstable wheel.

The engine drive torque is transmitted onto the unstable wheel by way of the differential gear and, thus, reverse rotation of the unstable wheel is prevented because the rotation of the unstable wheel in a direction opposite to the stable wheels can only occur when no engine drive torque acts on the unstable wheels. The present invention is based on the reflection that the sum of the four wheel speeds remains equal due to the permanent engine rotational speed and the constant transmission ratio of the differential gears so that the wheels accelerate on a high coefficient of friction, while the wheels decelerate, stop and reverse on a low coefficient of friction. On $\mu$-split descending gradients the low-$\mu$ wheels can reverse.

The status of the wheels is determined according to $$V_{ref} - K_b < V_{stable} < V_{ref} + K_b,$$

wherein $V_{ref}$=filtered medium wheel speed of the stable wheels $K_b$=correction factor $V_{stable}$=stable wheel.

The wheels are stable when the wheel speeds lie in a band around the medium wheel speed, that means, within a band which is determined by the correction factor $K_b$ that lies in a band of 2.5 km/h, preferably 1.3 km/h, above and below the medium wheel speed. The wheels are unstable when the wheel speeds lie outside the above-mentioned band.

The medium wheel speed $V_{ref}$ is calculated from the filtered maximum value of the second fastest wheel and the vehicle speed, i.e., the low-pass filtered maximum of the second fastest wheel and the vehicle speed or the ABS reference speed is produced. Low-pass filtering of the medium wheel speed is effected at 2.5 hertz.

The correction factor $K_i$ is smaller than ½. Due to the fact that the status of an unstable wheel is lower than 50% of the medium wheel speed, the stable wheels are braked immediately when an unstable wheel is detected. An unstable wheel is unable to reverse under the condition which is decisive for the status determination, because an engine drive torque is applied to the unstable wheel before it can reverse in the event of a wheel speed of the unstable wheel that is lower than 50% of the medium wheel speed.

Due to the fact that the wheel acceleration of the unstable wheel now as before is lower than $-0.4$ g, it is ensured that the danger of the unstable wheel reversing the direction of rotation, which may become real, is detected.

The pressure which must be introduced into the wheel brake cylinders of the wheel brakes for decelerating the stable wheels is determined according to $$req_p = K \times (V_{ref} - V_{ref\,nom})) + \text{offset},$$

wherein req$_p$=pressure requirement of the stable wheels

K=7 bar/(km/h)

V$_{ref\ nom}$=average speed of all wheels before an unstable wheel is detected offset=5 bar.

The pressure requirement of the stable wheels is calculated from the difference between the average speed of the stable wheels and the average speed of all wheels prior to the detection of an unstable wheel with a correction factor and offset factor.

Advantageously, the determinations of status are split up over a number of n time steps, and at least the values of the last status determination are stored. According to one embodiment, the pressure requirement of the preceding status determination is compared with the pressure requirement of the current status determination, and the current pressure requirement is overruled when the pressure requirement of the current status determination differs in its amount by less than p$_{kp}$ from the pressure requirement of the preceding status determination. The reference factor K$_p$<1 bar applies. Actuation of the hydraulic valves is prevented by this measure in order to enhance the control comfort and diminish noises.

In another embodiment, the unstable wheels of the preceding status determination are compared with the wheels of the current status determination, and upon deceleration of a preceding unstable wheel, the pressure build-up on this wheel is delayed. The delay of the pressure build-up on the preceding unstable wheel occurs within a period of time of 1 to 2 seconds, preferably, within 1.5 seconds. The control of the driving speed starts to operate only if the vehicle speed is <30 km/h, preferably <20 km/h, especially <12 km/h, and no wheel brake is active.

An embodiment of the present invention is indicated in the drawing and will be described in detail in the following.

Figure 1:
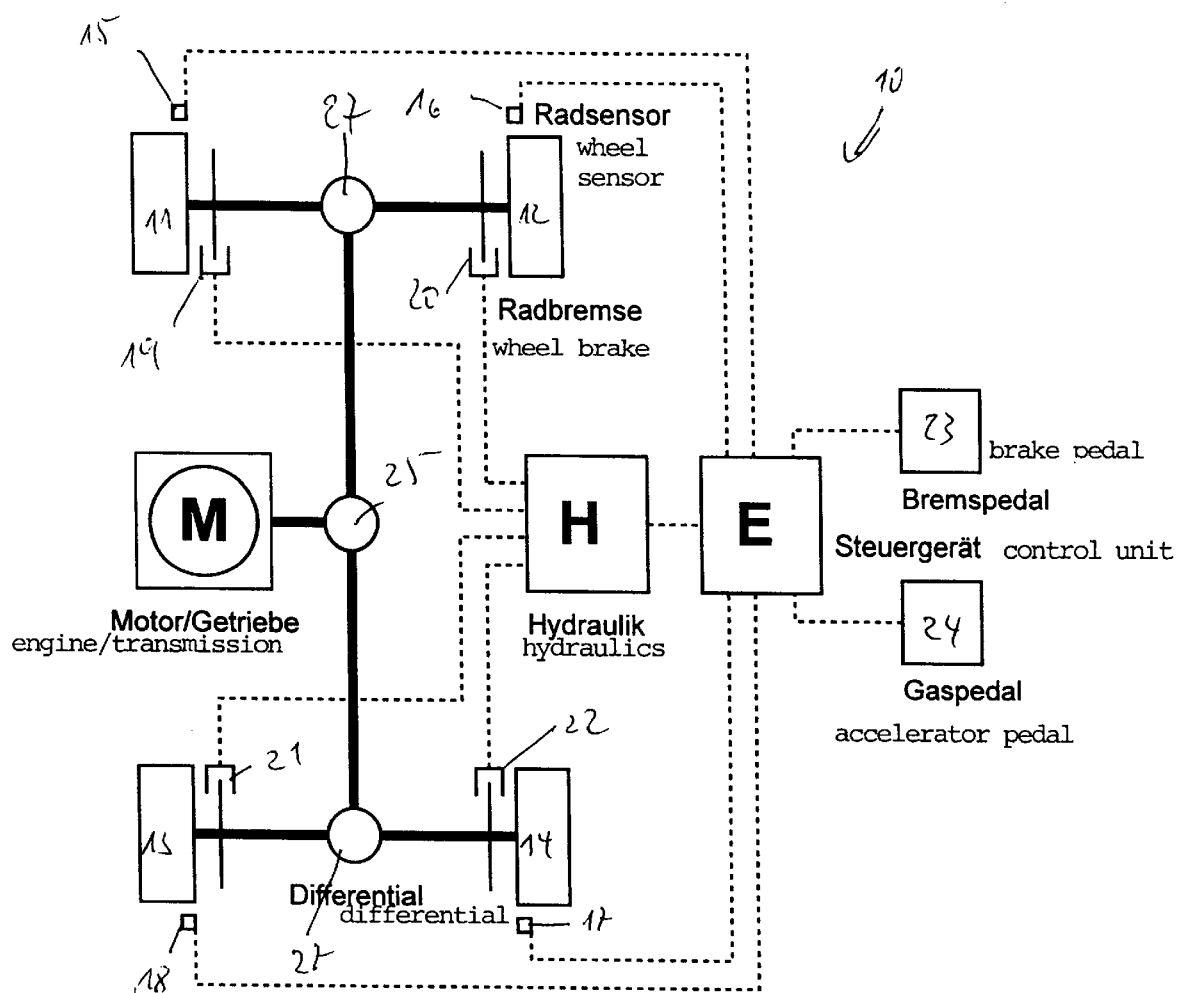
FIG. 1 is a simplified diagram of the device of the present invention.

As is shown in FIG. 1, the vehicle 10 has four wheels 11, 12, 13, 14. Associated with each wheel is a wheel sensor 15, 16, 17, 18 by means of which the wheel speeds are sensed. The values sensed by the wheel sensors are sent to an electronic control unit E which controls the wheel brakes 19, 20, 21, 22 associated with each wheel 11 to 14 corresponding to the input and calculated condition variables by way of a hydraulic unit H. Further, the electronic control unit E is furnished with values obtained by means of sensors 23, 24 at the brake pedal and accelerator pedal. Thus, the sensors 23, 24 issue analog signals to the electronic control unit E which depend on the position or the angle of the brake pedal or accelerator pedal.

As is also shown in FIG. 1, the vehicle 10 is an all-wheel permanently driven vehicle which is driven by way of an engine-transmission unit M, and a central differential gear 25, and a front-axle differential gear 26, and a rear-axle differential gear 27.

The hydraulic brake system including the actuatable solenoid valves is per se known and, therefore, need not be described in more detail. It is merely required to satisfy the demand that all wheel brakes 19 to 22 can be actuated separately of the electronic control unit E by means of the hydraulic unit H. In the normal operation of the vehicle, the electronic control unit E controls the hydraulic unit H by means of the anti-lock function to prevent locking of the wheels 11 to 14 when the driver applies the brake pedal. Also, there is provision of a traction slip control system. Both functions are performed in a known fashion by sensing the speed and acceleration of each wheel 11 to 14 and a vehicle speed calculated from the speeds of the wheels. The vehicle speed is calculated from an average value of the wheel speeds, leaving the speeds of those wheels out of account which are locking or exposed to slip.

In order to be able to start with the engine drag torque support mode (DTS-Dragtorque Support), the electronic control unit principally checks whether the DTS system is available, yaw torque control is not active, and the driver's preset demand for brake pressure is less than the pressure requirement determined for decelerating the stable wheels. When the above-mentioned conditions are satisfied, and the vehicle speed is lower than 30 km/h, preferably lower than 20 km/h, the DTS system will be activated. If one of the start conditions is not satisfied, i.e., if the vehicle speed is 30 km/h and higher, or if there is a system error, or a yaw torque control is active, or the driver's preset demand for brake pressure is higher than the pressure requirement determined for decelerating the stable wheels, the algorithm of the DTS system is terminated.

The initial test of the condition variables 'vehicle speed' and 'vehicle braking operation' is derived from the signals sent by the sensors 23, 24 to the electronic control unit E which sense the position or the angle of the accelerator pedal and brake pressure pedal.

Of course, the vehicle speed can also be produced from the signals of the wheel sensors 15 to 18, as has been described hereinabove. When the initial conditions are satisfied, the status of the wheels 11 to 14 is determined. The wheels 11 to 14 are split into 'stable wheels' and 'unstable wheels'.

To this end, the status of the wheels, e.g. 11 to 13, is determined according to V$_{ref}$-K$_b$<V$_{stable}$<V$_{ref}$+K$_b$, wherein V$_{ref}$=the medium wheel speed K$_b$=correction factor V$_{stable}$=stable wheel.

When the wheel speed lies outside the above-mentioned band, the wheel is unstable.

The correction factor K$_b$ preferably amounts to 1.3 km/h so that a wheel is stable when the wheel speed lies in a band around the medium wheel speed V$_{ref}$ of preferably 1.3 km/h. The medium wheel speed V$_{ref}$ is produced from the maximum value of the second fastest wheel, which value is low-pass filtered with 2.5 hertz, and the vehicle speed, or the per se known ABS reference speed which is determined in the ABS controller. The maximum of the second fastest wheel is taken into account to produce the medium wheel speed in order to reliably preclude the unstable wheel that rotates at a high speed.

Subsequently, the wheel brakes of the stable wheels are activated when the condition V$_{unstable}$<K$_i$×V$_{ref}$ and A$_{unstable}$<-0.4 g occurs, wherein V$_{unstable}$=speed of the unstable wheel A$_{unstable}$=acceleration of the unstable wheel V$_{ref}$=filtered medium wheel speed of the stable wheels K$_i$=correction factor.

When the wheel speed of the unstable wheel is lower than 50% of the medium wheel speed, i.e., when the correction factor K$_i$<½ and the wheel acceleration of the unstable wheel <-0.4 g, a pressure requirement is calculated, by way of which all stable wheels are decelerated by introducing a brake pressure into the wheel brake cylinders of the wheel brakes 19, and/or 21, and/or 22 corresponding to the calculated pressure requirement.

The pressure requirement for the stable wheels is determined according to reg$_p$=K×(V$_{ref}$-V$_{ref\ nom}$)+offset, wherein reg$_p$=pressure requirement of the stable wheels K=7 bar/km/h $V_{ref\ nom}$=average speed of all wheels before detection of an unstable wheel offset=5 bar.

The pressure requirement is calculated from the difference between the average speed of the stable wheels and the average speed of all wheels before the detection of an unstable wheel. When the pressure requirement of the stable wheels is calculated, brake pressure is introduced into the stable wheels, e.g. 11 to 13, corresponding to the calculated pressure requirement. Thus, the engine drive torque is transmitted onto the unstable wheel. Acceleration of the vehicle 10 and reverse rotation of the unstable wheels, e.g. 14, is reliably prevented by the compensation of the engine drag torque loss on the unstable wheels, e.g. 14, by means of an active pressure build-up on the stable wheels, that means, on the wheels with a high coefficient of friction. The pressure build-up can be carried out alternatively by the return pump associated with the hydraulic unit H or by an active actuation of the brake force booster.

According to an embodiment of the present invention, the status determination is split up over a number of n time steps, and at least the values of the last status determination are stored. The pressure requirement of the preceding status determination is compared with the pressure requirement of the current status determination, and the current pressure determination is overruled when the amount of the pressure requirement of the current status determination differs by less than $p_{Kp}$ from the pressure requirement of the preceding status determination. The reference factor $K_p$<1 bar. This measure serves to interrupt an actuation of the hydraulic valves in order to enhance the control comfort and diminish noises.

Accordingly, no active braking of the stable wheels is carried out when the calculated pressure requirement is below the driver's brake pressure requirement.

To prevent a new unstable condition after a successful stabilization of an unstable wheel, the unstable wheels of the preceding status determination are compared with the wheels of the current status determination, and when a preceding unstable wheel is decelerated, the pressure build-up of this wheel is effected within a period of time of 1 to 2 seconds, preferably, 1.5 seconds.

The DTS mode is deactivated when all wheels 11 to 14 run in a stable condition for at least one second, preferably 1.5 seconds, that means, the wheel speeds on all wheels lie in a band around the medium wheel speed, or the vehicle speed is <2.5 km/h.

What is claimed is:

1. A method of maintaining the engine brake of a vehicle during hill descent by an active, electronically controlled application of wheel brakes on at least one wheel, comprising:

a determination of the status of the wheels split into groups including at least one stable wheel group and including at least one unstable wheel, the deceleration of all of the stable wheels by applying the wheel brakes to the stable wheels in the event of at least one unstable wheel, and the transmission of an engine drive torque to the unstable wheel to prevent the unstable wheel from rotating in a direction opposite of the rotation of the stable wheels, on which the condition $$V_{unstable} < K_i \times V_{ref}$$

occurs, wherein $V_{unstable}$=speed of the unstable wheel $V_{ref}$=medium wheel speed of the stable wheels $K_i$=correction factor.

2. A method as claimed in claim 1, wherein the status of the wheels is determined according to $$V_{ref} - K_b < V_{stable} < V_{ref} + K_b$$

wherein $V_{ref}$=medium speed of the stable wheels $K_b$=correction factor $V_{stable}$=speed of a stable wheel.

3. A method as claimed in claim 1 wherein the correction factor $K_b$=2.5 km/h, preferably, $K_b$=1.3 km/h.

4. A method as claimed in claim 1 wherein the medium wheel speed of the stable wheels $V_{ref}$ is produced from the filtered maximum value of the second fastest wheel and the vehicle speed.

5. A method as claimed in claim 1 wherein the vehicle speed is the ABS reference speed.

6. A method as claimed in claim 1 wherein the correction factor $K_i$<½.

7. A method as claimed in claim 1 wherein the wheel acceleration of the unstable wheel is less than −0.4 g.

8. A method as claimed in claim 1 wherein the pressure requirement for the stable wheels is determined according to $$req_p = K \times (V_{ref} - V_{ref\ nom}) + offset,$$

wherein $req_p$=pressure requirement of the stable wheels, $V_{ref\ nom}$=average speed of all wheels before an unstable wheel is detected, K=7 bar/(km/h)

offset=5 bar.

9. A method as claimed in claim 1 wherein the status determinations are split up over a number of "n" time steps, and at least the values of the last status determination are stored.

10. A method as claimed in claim 1 wherein the pressure requirement of the preceding status determination is compared with the pressure requirement of the current status determination, and the current pressure requirement is overruled when the pressure requirement of the current status determination differs in its amount by less than $p_{Kp}$ from the pressure requirement of the preceding status determination.

11. A method as claimed in claim 1 wherein $P_{Kp}$ is the reference pressure value less than 1 bar.

12. A method as claimed in claim 1 wherein the unstable wheels of the preceding status determination are compared with the wheels of the current status determination, and upon deceleration of a preceding unstable wheel, the pressure build-up on this wheel is delayed.

13. A method as claimed in claim 1 wherein the current pressure build-up on the preceding unstable wheel is carried out within a period of time of 1 to 2 seconds.

14. A method as claimed in claim 13 wherein the current pressure build-up on the preceding unstable wheel is carried out within a period of time of about 1.5 seconds.

15. A method as claimed in claim 1 wherein the effect of the engine brake starts to operate only if the vehicle speed is less than 30 km/h, the system is available, no yaw torque control is active, and the driver's preset demand for brake pressure is less than the pressure requirement determined for decelerating the stable wheels.

16. A method as claimed in claim 15 wherein maintaining the effect of the engine brake starts to operate only if the vehicle speed is less than 20 km/h.

* * * * *

UNITED STATES PATENT AND TRADEMARK OFFICE
CERTIFICATE OF CORRECTION

PATENT NO.   : 6,692,090 B1
DATED        : February 17, 2004
INVENTOR(S)  : Harald Heyn et al.

Figure 2:
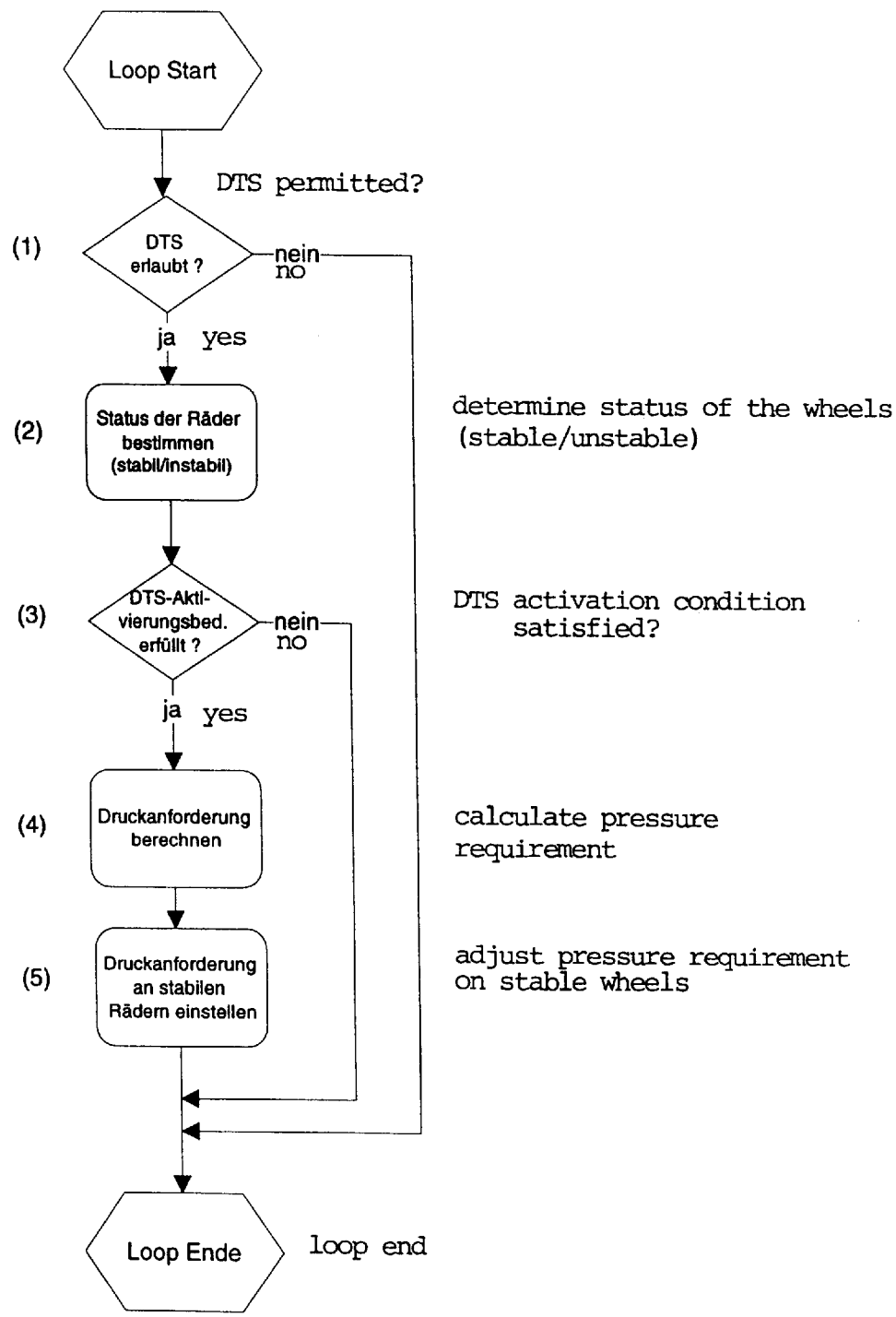
FIG. 2 is a flow chart of the method of controlling the effect of the engine brake of a vehicle during hill descent.

It is certified that error appears in the above-identified patent and that said Letters Patent is hereby corrected as shown below:

<u>Title page,</u>
Item [75], Inventors, delete "Colbe-BürgeIn" and substitute -- Colbe-Bürgein -- in its place.
Item [57], ABSTRACT,
Lines 4-5, delete "present invention is characterized by a determination of" and substitute -- method determines -- in its place.
Lines 6-7, delete "the deceleration of all stable wheels (11 to 14)" and substitute -- decelerates all stable wheels -- in its place.
Line 15, delete "factor (FIG. 2)." and substitute -- factor. -- in its place.

Signed and Sealed this

First Day of June, 2004

JON W. DUDAS
*Acting Director of the United States Patent and Trademark Office*